US008102583B2

(12) United States Patent
Cook

(10) Patent No.: US 8,102,583 B2
(45) Date of Patent: Jan. 24, 2012

(54) REAL-TIME OPTICAL COMPENSATION OF ORBIT-INDUCED DISTORTION EFFECTS IN LONG INTEGRATION TIME IMAGERS

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 509 days.

(21) Appl. No.: 12/412,118

(22) Filed: Mar. 26, 2009

(65) Prior Publication Data

US 2010/0245965 A1 Sep. 30, 2010

(51) Int. Cl.
G02B 17/06 (2006.01)
G02B 27/00 (2006.01)
(52) U.S. Cl. .................... 359/224.1; 359/850
(58) Field of Classification Search ............ 359/223.1, 359/224.1, 846, 847, 849, 850, 857, 858, 359/861–865, 872–874, 876
See application file for complete search history.

(56) References Cited

U.S. PATENT DOCUMENTS

| 4,834,517 | A | 5/1989 | Cook |
| 5,105,299 | A * | 4/1992 | Anderson et al. .......... 359/223.1 |
| 5,550,672 | A | 8/1996 | Cook |
| 5,557,477 | A * | 9/1996 | Sawicki .................. 359/846 |
| 6,236,490 | B1 * | 5/2001 | Shen ....................... 359/247 |
| 6,801,370 | B2 * | 10/2004 | Sekiyama et al. ......... 359/726 |
| 6,977,777 | B1 | 12/2005 | Wick |
| 7,102,114 | B2 * | 9/2006 | Graves et al. ............ 250/201.9 |
| 2005/0254112 | A1 * | 11/2005 | Webb et al. .............. 359/224 |
| 2007/0008634 | A1 * | 1/2007 | Chiu ......................... 359/847 |
| 2007/0229993 | A1 * | 10/2007 | Hemmati et al. .......... 359/846 |
| 2008/0218694 | A1 | 9/2008 | Chen et al. |

FOREIGN PATENT DOCUMENTS

| FR | 2569865 A1 | 3/1986 |
| WO | 2008062290 A | 5/2008 |
| WO | 2009059010 A1 | 5/2009 |

OTHER PUBLICATIONS

International Search Report and Written Opinion dated Mar. 15, 2010 of PCT/US2010/021748 filed Jan. 22, 2010 (15 pages).
Vdovin et al. "Micromachined Membrane Deformable Mirrors for Space Applications", Eurosensors XIV, Aug. 27-30, 2000, Copenhagen, Denmark, pp. 309-310.
Bagwell et al. "Adaptive Optical Zoom Sensor", Sandia Report, SAND2005-7208, Sandia National Laboratories, Nov. 2005, pp. 1-35.
Vdovin et al. "Micromachined Mirror with a Variable Focal Distance", EOS Tech Digest, Apr. 1-3, 1996, Engelberg, Switzerland, pp. 28-29.

* cited by examiner

*Primary Examiner* — Frank Font
(74) *Attorney, Agent, or Firm* — Pillsbury Winthrop Shaw Pittman LLP

(57) ABSTRACT

An apparatus and method for effecting and changing optical distortions is disclosed. The apparatus includes a beam imaging apparatus including a first deformable mirror, a second deformable mirror, and a beam-steering apparatus. The beam-steering apparatus includes a plurality of planar tiltable mirrors arranged to define a radiation beam path therebetween, wherein the plurality of planar tiltable mirrors comprises at least three tiltable mirrors. A mirror drive system is configured to tilt each respective planar mirror about its respective axis of rotation or axes of rotation and a controller is configured to control deformation of a reflective surface of the first and the second deformable mirrors.

19 Claims, 4 Drawing Sheets

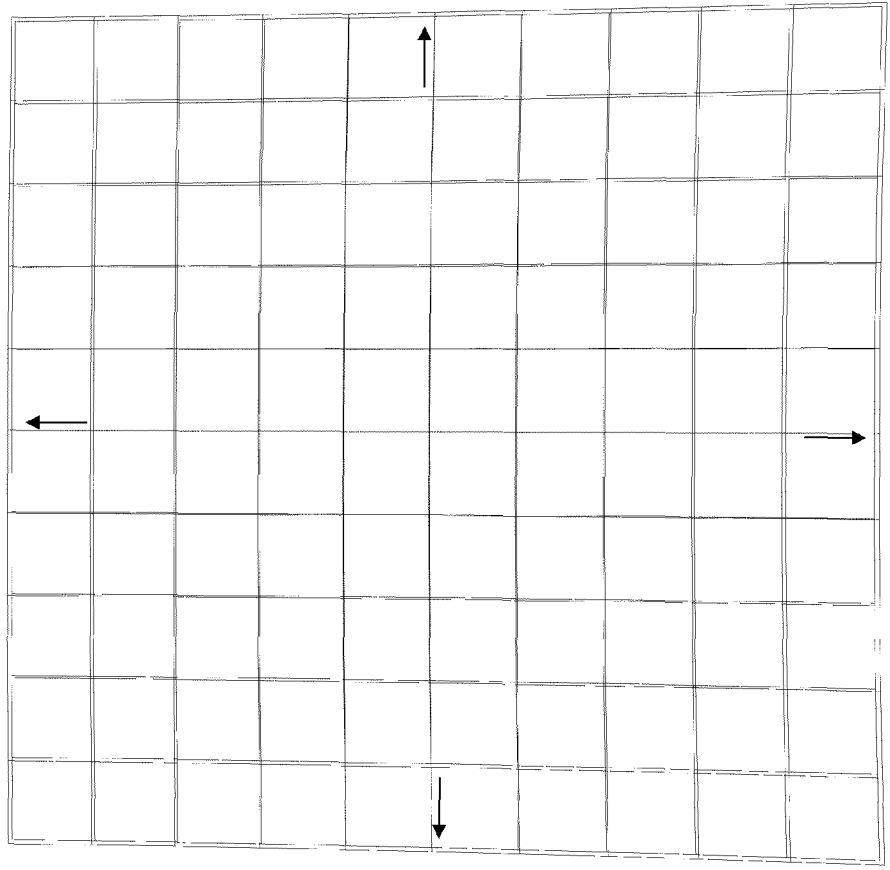
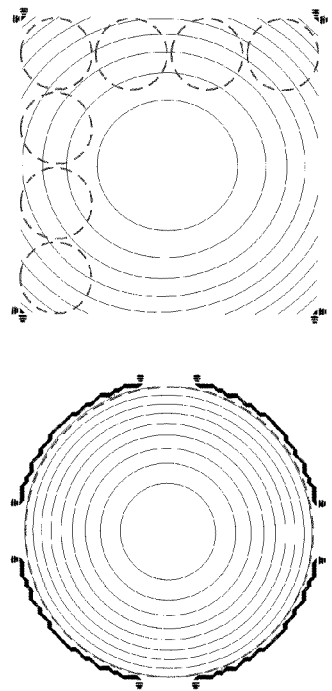
Figure 2A
1% SCALE
70 x 70 mrad FOV Imager
2 x 2 mrad FOV System
~7K x 7K, 9 um FPA
Figure 2B
2 wvs PV
DM1
Figure 2C
82 wvs PV
DM2
Delta RMS WFE, um
Avg. 0.006
Worst 0.020

Figure 3B — 3 wvs PV DM1

Figure 3C — 80 wvs PV DM2

Delta RMS WFE, um
Avg. 0.005
Worst 0.014

1% ANAMORPH 70 x 70 mrad FOV Imager
2 x 2 mrad FOV System
~7K x 7K, 9 um FPA

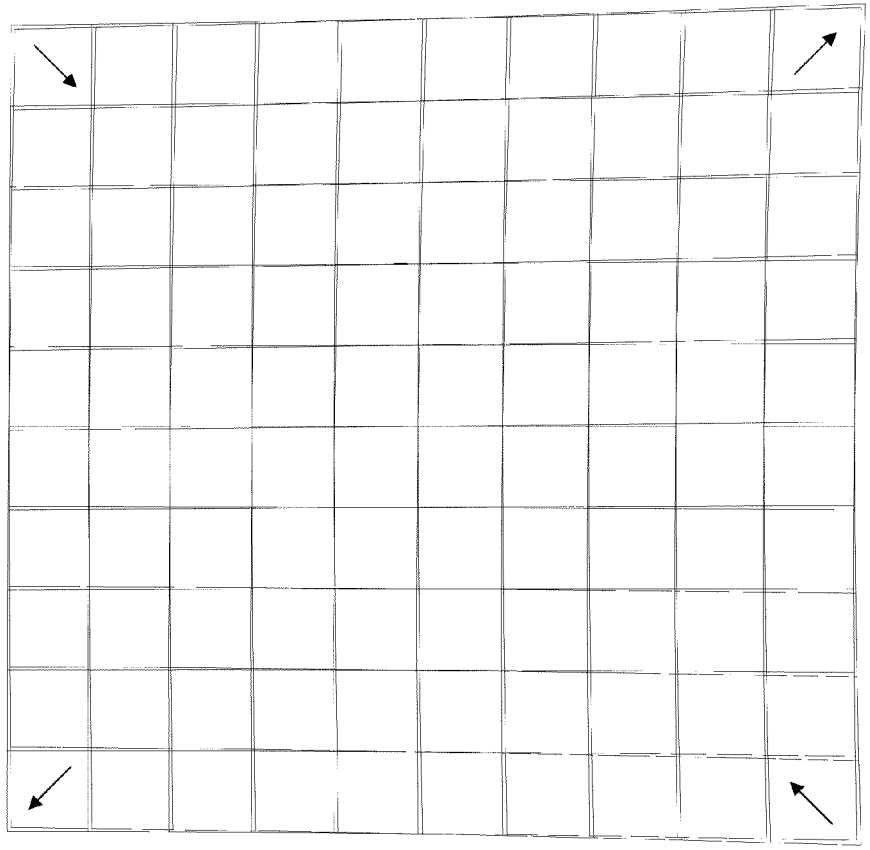
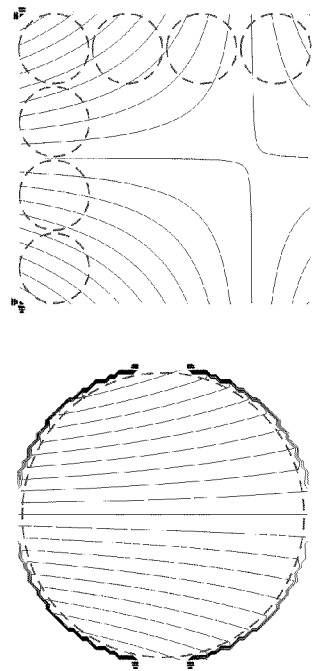
Figure 4A — 1% DIAGONAL STRETCH-COMPRESS
70 x 70 mrad FOV Imager
2 x 2 mrad FOV System
~7K x 7K, 9 um FPA
Figure 4B — 18 wvs PV DM1
Figure 4C — 224 wvs PV DM2
Delta RMS WFE, um
Avg. 0.008
Worst 0.019

REAL-TIME OPTICAL COMPENSATION OF ORBIT-INDUCED DISTORTION EFFECTS IN LONG INTEGRATION TIME IMAGERS

BACKGROUND

This disclosure relates generally to the field of imaging systems, and more particularly, to systems and methods for real time optical compensation of orbit induced distortion effects in long integration time imagers Space-based Low Earth Orbit (LEO) imaging systems, as well as airborne imagers that are Earth-looking, have certain limitations to the length of integration time that they can gather the target signal. Chief among these limitations has been the changing of the projection of the sensor focal plane array (FPA) onto the Earth as the sensor moves along in orbit. Even with perfect stabilization of the field of view (FOV) center, the FPA can undergo a series of changes or distortions as it projects to the ground during the desired long integration. These series of distortions include: 1) rotation about the line of sight (LOS); 2) an overall and uniform expansion or compression of scale; 3) an anamorphic expansion and/or compression; and 4) a positive or negative stretch along one or both diagonals. All of these effects can cause many pixels of image smear on the FPA away from the FOV center and render the imagery useless.

Certain attempts have been made to optically address these distortion effects individually, as in only rotation effects, or only the uniform scale change, but no solutions are known that have addressed, even individually, the more difficult anamorphic or diagonal terms. Additionally, no previous attempts have been shown that are nearly indiscernible to the basic imaging properties of the optics; this is, that they effect distortion only, and not image quality.

Very-long integration times, on the order of seconds, needed to take "daytime quality" near-visible imagery at night are severely limited (~100×) by orbit induced geometry or distortion changes which smear the image over large 2-D FPAs. The present disclosure addresses these issues by demonstrating optical correction of all distortion terms for relevant orbit parameters, at a level of 1%, without significant impact to system root-mean-square (RMS) wavefront error.

Even with perfect LOS stabilization (FOV center), platform motion during long integration times causes severe geometry changes for pixels away from the FOV center. These geometry changes act like "distortion" to cause image smear that increases as the distance from the array center. Because of this, integration time of a large visible staring array on an airborne or space platform in low light conditions is limited.

SUMMARY

In various aspects of the present disclosure, an apparatus for effecting and changing optical distortions is disclosed. The apparatus comprises a beam imaging apparatus including a first deformable mirror, a second deformable mirror, and a beam-steering apparatus; the beam-steering apparatus including a plurality of planar tiltable mirrors arranged to define a radiation beam path therebetween, wherein the plurality of planar tiltable mirrors comprises at least three tiltable mirrors; a mirror drive system configured to tilt each respective planar mirror about its respective axis of rotation or axes of rotation; and a controller configured to control deformation of a reflective surface of the first and the second deformable mirrors.

In various aspects of the present disclosure, a method for effecting and changing distortions in an image produced by an beam-imager is disclosed. The beam imager includes a first deformable mirror, a second deformable mirror, and a beam-steering device. The method comprises receiving radiation by a deformable reflecting surface of the first deformable mirror; steering the received radiation by the beam-steering device to a deformable reflecting surface of the second deformable mirror, wherein the beam-steering device includes plurality of planar tiltable mirrors positioned to define a radiation beam path therebetween, wherein the plurality of planar tiltable mirrors comprises at least three tiltable mirrors; deforming the first and the second deformable reflecting surfaces of the first and the second deformable mirrors to effect and change one or more distortions in an image produced by the beam-imager.

Other features of the present disclosure will be apparent from the following more detailed description of the preferred embodiment, taken in conjunction with the accompanying drawings, which illustrate, by way of example, the principles of the disclosure. The scope of the disclosure is not, however, limited to this preferred embodiment.

BRIEF DESCRIPTION OF THE DRAWINGS

FIG. 2A shows 1% uniform scale or focal length change of the FPA in accordance with an aspect of the present disclosure.

FIG. 2B shows a contour map for the reflecting surface of first deformable mirror DM1 to correct for uniform scale or focal length change in accordance with an aspect of the present disclosure.

FIG. 2C shows a contour map for the reflecting surface of second deformable mirror DM2 to correct for uniform scale or focal length change in accordance with an aspect of the present disclosure.

FIG. 3B shows a contour map for the reflecting surface of first deformable mirror DM1 to correct for anamorphic change in accordance with an aspect of the present disclosure.

FIG. 3C shows a contour map for the reflecting surface of second deformable mirror DM2 to correct for anamorphic change in accordance with an aspect of the present disclosure.

FIG. 4A shows 1% diagonal stretch/compression of the FPA in accordance with an aspect of the present disclosure.

FIG. 4B shows a contour map for the reflecting surface of first deformable mirror DM1 to correct for diagonal stretch/compression in accordance with an aspect of the present disclosure.

FIG. 4C shows a contour map for the reflecting surface of second deformable mirror DM2 to correct for diagonal stretch/compression in accordance with an aspect of the present disclosure.

DETAILED DESCRIPTION

Figure 1:
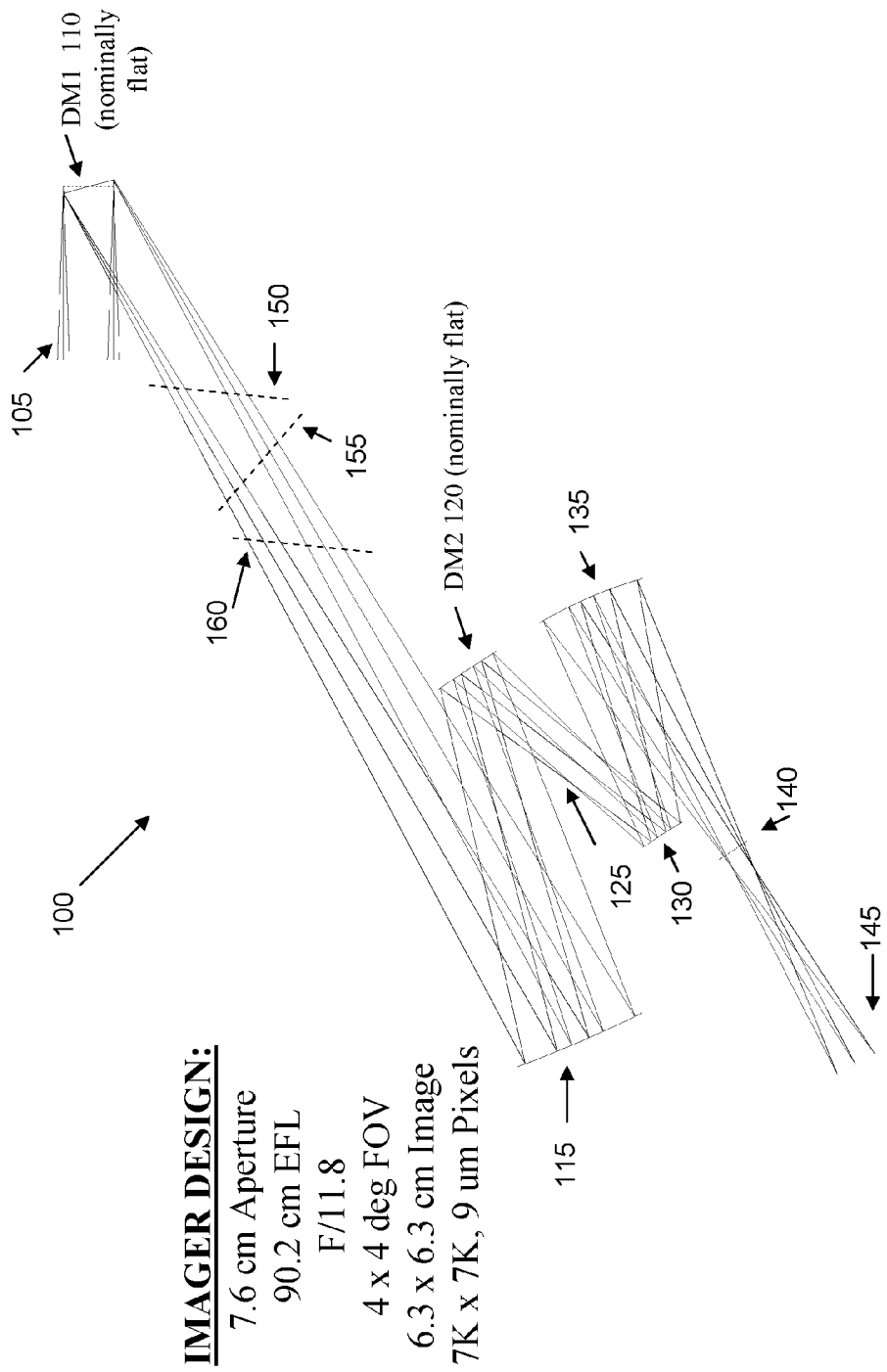
FIG. 1 shows a schematic perspective depiction of an apparatus for effecting and changing optical distortions using two deformable mirrors in accordance with an aspect of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form.

Features that are described and/or illustrated with respect to one embodiment may be used in the same way or in a similar way in one or more other embodiments and/or in combination with or instead of the features of the other embodiments.

Correction of distortion due to rotation about the line of sight (LOS) is addressed in commonly assigned, co-pending U.S. patent application Ser. No. 11/980,289, filed on Oct. 30, 2007 entitled "Beam-Steering Apparatus Having Five Degrees Of Freedom Of Line-Of-Sight Steering" by Lacy G. Cook, which is hereby incorporated by reference in its entirety. This co-pending application discloses a beam-steering apparatus that permits up to five degrees of freedom of the steering of the line-of-sight output beam or input beam. That is, it provides steerability of the line-of-sight in two angular degrees of freedom (elevation and azimuth), one rotational degree of freedom about the line of sight, and two lateral degrees of freedom. The beam-steering apparatus may include three, four, or five tiltable planar (i.e., flat, unpowered) mirrors that may each be tilted about one axis of rotation or two axes of rotation. It may also include non-tilting fold mirrors or other elements. The use of three, four, or five planar tiltable mirrors to achieve five degrees of freedom of the steering of the line-of-sight output or input beam is a great improvement over, and simplification of, the approaches normally used to achieve even fewer degrees of freedom. It reduces the weight, size, and complexity of the apparatus required to achieve the beam steering, and offers the system designer great flexibility in the selection of components. Because the beam-steering apparatus uses only mirrors, chromatic aberration is avoided. This approach utilizes the angular cross-coupling effect experienced in an image when a mirror is tilted to the side, normally considered as a disadvantage in optical systems, to achieve beam steering in five degrees of freedom.

A mirror drive system may tilt the respective planar mirrors by any amount to achieve the necessary beam steering. In some aspects of the disclosure, the mirror drive system tilts the planar mirrors in each case about its axis of rotation or axes of rotation by an amount of not more than 10 degrees, and in some aspects by not more than 1 degree. In some aspects, larger tilts may also be used.

Distortion caused by platform motion during long integration times can be categorized by four basic eigenmodes, which are rotation about the LOS, uniform expansion or contraction scale change, anamorphic scale change (different scale in x and y planes) and diagonal stretch/compress (corners approach or recede).

Aspects of the present disclosure are directed to two parts: 1) a 2-D LOS control, 2-D pupil control and rotation about LOS; and 2) the use of 2 deformable mirrors (DM) suitably located within the optical train that control uniform scale, anamorphic scale, and diagonal stretch.

In the 3, 4, and 5-mirror variants, the beam-steering mirrors (BSM) can be located in the collimated region between an afocal foreoptical system and an imager, and that the integrated effect of the operation of the BSMs is to provide control of 5 functions: x and y LOS control, x and y pupil control, and rotation of the scene about the LOS. The BSMs, either the 3, 4, or 5-mirror variant, must provide a total of 5 angular degrees of freedom in order to provide this control.

FIG. 1 shows an apparatus for effecting and changing optical distortions. In particular, a ray trace of the apparatus including a 4-mirror arrangement in accordance with an aspect of the present disclosure is shown. The 4-mirror beam-imaging arrangement includes a first deformable mirror DM1, a second deformable mirror DM2 and a beam-steering apparatus. The arrangement of the first DM1 and second DM2 deformable mirrors within the beam-imaging apparatus provide for compensation for the three additional distortion terms after control of rotation about the LOS. Those distortion terms are: 1) an overall uniform expansion or compression of scale, also referred to as focal length change; 2) an anamorphic expansion and/or compression that is different between the x and y planes; and 3) a positive or negative stretch along one or both diagonals. The first deformable mirror DM1 is arranged in the beam-steering apparatus at the imager entrance pupil, which can also be the foreoptics exit pupil and the second deformable mirror DM2 is arranged as the nominally flat secondary mirror of the imager.

The previously described 3-, 4, or 5-variation beam steering mirrors (BSMs) for LOS control, pupil control, and rotation about the LOS can be in the accessible collimated optical path between DM1 and DM2.

As shown in FIG. 1, radiation 105, in the form of visible light, enters apparatus 100 and is collected by first deformable mirror DM1 110 and forms intermediate image 125 by way of the positive optical power of secondary mirror 115. By way of a non-limiting example, first deformable mirror DM1 110 is a nominally flat mirror having a 3 inch diameter and substantially located near a pupil of beam-imaging apparatus such that all field points occupy the mirror surface. Radiation 105 is then reflected to secondary mirror 115, which may be a fixed non-movable (passive) mirror. Tertiary mirror 120, which is second deformable mirror DM2 120 is arranged to receive radiation 105 from secondary mirror 115. By way of a non-limiting example, second deformable mirror DM2 120 is a nominally flat mirror having a 4 inch diameter and substantially located mid-way between secondary mirror 115 and image 125. Moreover, second deformable mirror DM2 120 should not be located substantially near a pupil or a image plane. The arrangement of DM2 120 is such that beam wander and beam footprint size are substantially as shown in FIGS. 2C, 3C and 4C, which are discussed in more detail below. Quaternary mirror 130 and quinary mirror 135 cooperate to relay intermediate image 125 through exit pupil 140 to focal plane 145 for viewing. By the nature of the arrangement of the optical components of the apparatus 100, exit pupil 140 is an optical conjugate to the pupil represented by the location of DM1 110. In some aspects of the disclosure, apparatus 100 may include an additional sixth mirror (not shown), or may not include quinary mirror 135. Additional details of the beam-steering apparatus can be found in U.S. Pat. No. 4,834,517 entitled "Method and Apparatus for Receiving Optical Signals" and U.S. Pat. No. 5,550,672 entitled "Off-Axis Three-Mirror Anastigmat Having Corrector Mirror" both by Lacy G. Cook, which are hereby incorporated by reference in their entirety.

Beam-steering apparatus includes at least three tiltable planar mirrors. Approximate locations of the 3-mirror variant of the beam-steering apparatus are shown at positions 150, 155 and 160, represented as dotted lines, within the radiation path. As shown, the at least three tiltable planar mirrors of the beam-steering apparatus are arranged in an afocal collimated optical space. Other appropriate positions of the other tiltable planar mirrors in the 4- and 5-mirror variants would be apparent.

In some embodiments, there may also be inactive, non-tiltable mirrors (not shown) in apparatus 100. The inactive, non-tiltable mirrors are typically planar mirrors that serve to fold the radiation beam path. The inactive, non-tiltable mirrors are fixed in space relative to the other mirrors.

Deformable mirrors DM1 110 and DM2 120 may be controlled by one or more controllers (not shown). The controllers are configured to control the amount of surface deformation of deformable mirrors DM1 110 and DM2 120 depending on the type and amount of distortions apparatus 100 may produce.

By way of a non-limiting example, the imager of FIG. 1 may have the following design parameters. The imager may have a 7.6 cm aperture, 90.2 cm effective focal length, F/11.9, 4×4 degree FOV, equivalently 70×70 mrads, which is configured to produce a 6.3×6.3 cm image that is captured by a 7K×7K, 9 μm pixels FPA.

It should be noted that because of the location of the DMs in the optical path, the beam footprint diameters on DM1 and DM2 are (for this scale simulation discussed below), respectively 3 inches and 0.76 inches. This is in a ratio of about 4:1, and for certain surface deformations described by Zernike polynomial terms where the surface sag is proportional to R2, this represents a 16:1 ratio of deformations. Also, due to the collimated pupil located at DM1 and the convergent beam on DM2 that also exhibits considerable mapping as a function of FOV (some 1.35 inches for 2 degree FOV), DM2 can be expected to play a more major role in deviating the chief rays to effect distortion, and DM1 can be expected to play a more major role in compensating for wavefront errors (i.e., maintaining image quality) that would otherwise be adversely effected by the operation of DM2. Together, they have been shown in simulation to be capable of introducing the three additional distortion terms described above (scale, anamorph, and diagonal) in the amount of 1% of the total imager FOV, and to do so with impacts to the root mean square (RMS) wavefront error of the imager that are in all cases less than 0.020 μm (with the FOV average change being more like 0.007 μm). This result compares favorably with a total system wave front error (WFE) budget that might typically expected to be about 0.067 μm RMS.

In the arrangement shown in FIG. 1, it is assumed that a sensor center FOV is stable to <⅓ pixel.

Figure 3A:
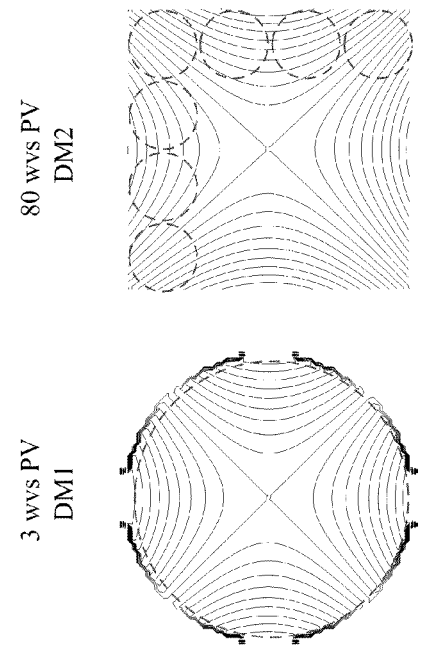
FIG. 3A shows a 1% anamorphic change of the FPA in accordance with an aspect of the present disclosure.
Figure 3A:
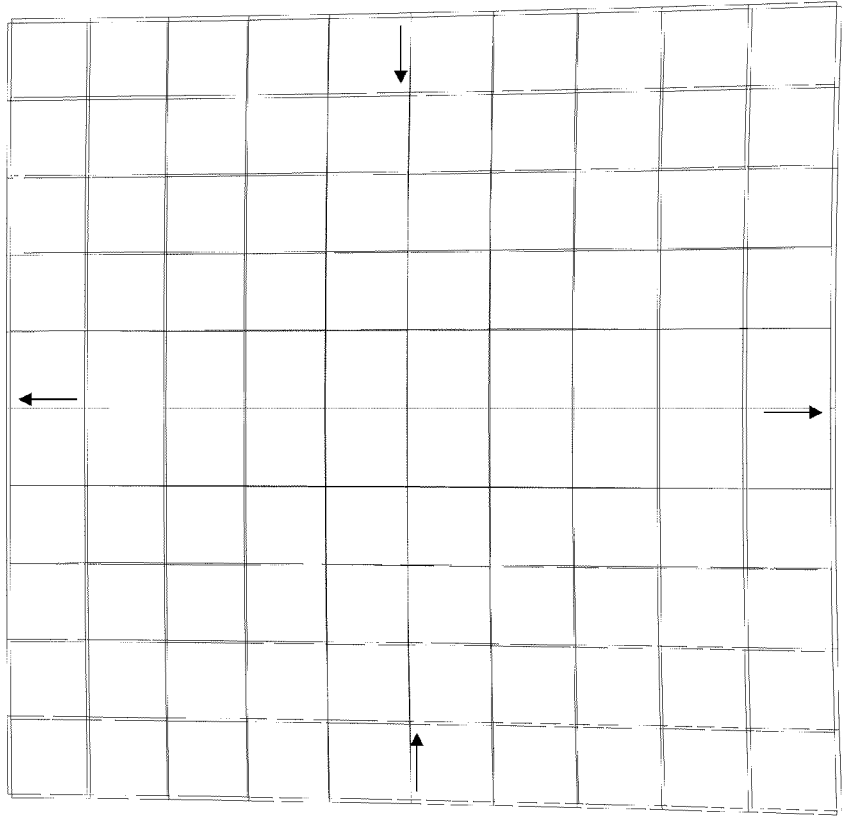

The FIGS. 2A, 3A and 4A show 1% scale simulation results for the scale (FIG. 2A), anamorph (FIG. 3A) and diagonal distortion (FIG. 4A) terms. For the simulations, a 70×70 mrad FOV imager, and ~7K×7K pixels, 9 μm FPA was used. In each case, the distortion change of 1%, or ~50 pixels (as shown below, at FPA diagonal corner), is depicted, the figures of the DMs are shown, and the average and worst case RMS WFE growths are given.

Table 1 shows a comparison of various optical parameters of an imager system only and an imager system that is arranged behind a 35× afocal telescope. As can be seen in the table, aperture and focal length of the imager behind a 35× afocal telescope are increased by a factor of 35 when compared to the imager alone, while the field of view is reduced by that same factor. As a result, pixel size remains the same, while the angle in which the pixel size subtense is decreased by 35 times.

TABLE 1

| Optical parameters | Imager Only | Imager behind 35X Afocal Telescope |
|---|---|---|
| Aperture (cm) | 7.6 | 266 |
| Optical speed | F/11.9 | F/11.9 |
| Focal length (cm) | 90.2 | 3157 |
| Field of view (°) | 4 × 4 | 0.114 × 0.114 |
| Field of view (millirads) | 70 × 70 | 2 × 2 |
| Pixel size (μm) | 9 | 9 |
| Pixel subtense (μrads) | 10 | 0.286 |

To illustrate what a 1% distortion change represents in terms of pixels, consider the following. First, consider a FPA having 2.0×2.0 mrad FOV system with a 2.83 mrad FOV diagonal. For a FPA having 7K×7K pixels, each pixel is 0.286 μrad. Given this, the effective smear is left uncorrected would be $(1.42 \times 10^{-3}) \ast (0.01)/0.286 \times 10^{-6}$ or 50 pixels at the diagonal. If the allowable smear is 0.25 pixel, this reduces the available integration time by 50/0.25 or by 200 times. For a 50 pixel rotation at the corner of the above array, this represents 50/5000=0.010=10 mrad, or 0.57 degrees of rotation.

FIG. 2A shows 1% uniform scale or focal length change of the FPA. As shown, pixels near the edge of the Figure are uniformly distorted outward, or stretched, from the center of the FPA. FIGS. 2B and 2C show a contour map of the reflecting surface of the first deformable mirror DM1 and the second deformable mirror DM2, respectively, that provides for correction of the distortion caused by the uniform scale change. The contour of first deformable mirror DM1 has both power and tilt terms with a surface deformation of 2 visible waves peak-to-valley. The contour of second deformable mirror DM2 has a strong R2 power Zernike term to direct the chief rays with a surface deformation of 82 visible waves peak-to-valley. The average change in RMS WFE for the entire image optical system was 0.006 μm and the worst case RMS WFE was 0.020 μm.

The dotted lines of FIGS. 2B and 2C, as well as FIGS. 3B, 3C, 4B and 4C, discussed below, show representative field mapping circles as dotted circles on the contour map. For FIG. 2A, all field points occupy the entire surface of first deformable mirror DM1. For FIG. 2B, different parts of the field of view (each individual dotted circle) are mapped to different parts of the second deformable mirror DM2. In other words, the dotted circles or beam footprint are a representation of the outline of the aperture on the surface of the mirror.

FIG. 3A shows a 1% anamorphic scale change of the FPA. As shown, pixels in the vertical direction are stretch away from the center of the FPA, while pixels in the horizontal direction are compressed toward the center of the FPA. FIGS. 3B and 3C show a contour map of the reflecting surface of the first deformable mirror DM1 and the second deformable mirror DM2, respectively, that provides for correction of the distortion caused by the anamorphic scale change. Both first and second deformable mirrors DM1 and DM2 exhibit ($X^2 - Y^2$) astigmatism Zernike terms with DM1 having a surface deformation of 3 visible waves peak-to-valley and DM2 having a surface deformation of 80 visible waves peak-to-valley. The average change in RMS WFE for the entire image optical system was 0.005 μm and the worst case RMS WFE was 0.014 μm.

FIG. 4A shows 1% diagonal stretch/compression of the FPA. As shown, pixels along one diagonal are stretched away from the center of the FPA, while pixels along the other diagonal are compressed toward the center of the FPA. FIGS. 4B and 4C show a contour map of the reflecting surface of the first deformable mirror DM1 and the second deformable mirror DM2, respectively, that provides for correction of the distortion caused by the diagonal stretch/compression. DM1 has mostly tilt terms having a surface deformation of 18 visible waves peak-to-valley and DM2 has a dominate (XY) 45-astigmatism Zernike terms having a surface deformation of 224 visible waves peak-to-valley. The average change in RMS WFE for the entire image optical system was 0.008 μm and the worst case RMS WFE was 0.019 μm.

Although a particular embodiment of the disclosure has been described in detail for purposes of illustration, various modifications and enhancements may be made without departing from the spirit and scope of the disclosure. Accordingly, the disclosure is not to be limited except as by the appended claims.

What is claimed is:

1. An apparatus for effecting and changing optical distortions, the apparatus comprising:
   a beam imaging apparatus including a first deformable mirror, a second deformable mirror, and a beam-steering apparatus;
   the beam-steering apparatus including a plurality of planar tiltable mirrors arranged to define a radiation beam path therebetween, wherein the plurality of planar tiltable mirrors comprises at least three tiltable mirrors;
   a mirror drive system configured to tilt each respective planar mirror about its respective axis of rotation or axes of rotation; and
   a controller configured to control deformation of a reflective surface of the first and the second deformable mirrors.

2. The apparatus according to claim 1, wherein each of the at least three planar tiltable mirrors has a center of rotation lying in a plane of the mirror, and wherein each of the at least three planar tiltable mirrors is tiltable about one axis of rotation or two orthogonal axes of rotation that lie in the plane of the mirror.

3. The apparatus according to claim 1, wherein the at least three mirrors of the beam-steering apparatus are arranged in an afocal collimated optical space.

4. The apparatus according to claim 1, wherein the first deformable mirror is substantially arranged near a pupil of the beam-imaging apparatus and the second deformable mirror is substantially arranged near a mid-way point between a pupil and a focal plane of the beam-imaging apparatus.

5. The apparatus according to claim 1, wherein the first and the second deformable mirrors are configured to effect and change optical distortion of the beam-imaging apparatus.

6. The apparatus according to claim 5, wherein the optical distortion that is effected and changed is selected from the group consisting of a uniform scale, an anamorphic scale, a diagonal stretch, and rotation about a line-of-sight.

7. The apparatus according to claim 1, wherein the plurality of planar tiltable mirrors are beam-steering mirrors configured to be controlled in a total of five angular degrees of freedom.

8. The apparatus according to claim 1, wherein the plurality of planar tiltable mirrors are configured to provide control of x and y line-of-sight control, x and y pupil control, and rotation of a scene about the line-of-sight.

9. The apparatus according to claim 1, wherein the second deformable mirror is arranged as a nominally flat tertiary mirror of an imager.

10. The apparatus according to claim 1, wherein a total number of planar tiltable mirrors is at least three and no more than five.

11. A method for effecting and changing distortions in an image produced by an beam-imager, wherein the beam imager includes a first deformable mirror, a second deformable mirror, and a beam-steering device, the method comprising:
   receiving radiation by a deformable reflecting surface of the first deformable mirror;
   steering the received radiation by the beam-steering device to a deformable reflecting surface of the second deformable mirror, wherein the beam-steering device includes plurality of planar tiltable mirrors positioned to define a radiation beam path therebetween, wherein the plurality of planar tiltable mirrors comprises at least three tiltable mirrors;
   deforming the first and the second deformable reflecting surfaces of the first and the second deformable mirrors to effect and change one or more distortions in an image produced by the beam-imager.

12. The method according to claim 11, wherein each of the at least three planar tiltable mirrors has a center of rotation lying in a plane of the mirror, and wherein each of the at least three planar tiltable mirrors is tiltable about one axis of rotation or two orthogonal axes of rotation that lie in the plane of the mirror.

13. The method according to claim 11, wherein the at least three planar tiltable mirrors of the beam-steering device are arranged in an afocal collimated optical space.

14. The method according to claim 11, comprising arranging the first deformable mirror substantially near a pupil of the beam-imager and arranging the second deformable mirror substantially near a mid-way point between a pupil and a focal plane of the beam-imager.

15. The method according to claim 11, wherein the one or more distortions are selected from the group consisting of a uniform scale, an anamorphic scale, a diagonal stretch, and a rotation about a line-of-sight.

16. The method according to claim 11, wherein the plurality of at least three planar tiltable mirrors are beam-steering mirrors configured to be controlled in a total of five angular degrees of freedom.

17. The method according to claim 11, wherein the plurality of at least three planar tiltable mirrors are configured to provide control of x and y line-of-sight control, x and y pupil control, and rotation of a scene about the line-of-sight.

18. The method according to claim 11, wherein the second deformable mirror is arranged as a nominally flat tertiary mirror of the beam-imager.

19. The method according to claim 11, wherein a total number of planar tiltable mirrors is at least three and no more than five.

* * * * *